PEN HOLDER ATTACHMENT DEVICE

Original Filed Dec. 5, 1969

INVENTOR.
FORREST I. CALKINS
BY Julian Caplan
ATTORNEY

United States Patent Office

Re. 28,289
Reissued Dec. 31, 1974

28,289

PEN HOLDER ATTACHMENT DEVICE

Forrest I. Calkins, 3340 Allen Court,
Santa Clara, Calif. 95051

Original No. 3,627,182, dated Dec. 14, 1971, Ser. No. 882,475, Dec. 5, 1969. Application for reissue May 14, 1973, Ser. No. 359,659
Int. Cl. A45c *11/34*
U.S. Cl. 224—28 D 8 Claims

Matter enclosed in heavy brackets [ ] appears in the original patent but forms no part of this reissue specification; matter printed in italics indicates the additions made by reissue.

ABSTRACT OF THE DISCLOSURE

A tapered, tubular sheath is shaped to receive, and retain against unintentional dislodgement, the end of a conventional ballpoint pen. Ears project from opposite sides of the sheath providing a flat attachment surface. Apertures are formed in the ears to receive a wrist-encircling strap. As an alternate means of attachment to a telephone base or other structure, a fiber backing carrying pressure sensitive adhesive on top and bottom surfaces may be applied to the attachment surface and protected by removable paper. The paper may be removed to attach the device to a permanent structure; the backing itself may be removed to expose the apertures for insertion of the strap. A metal clip may be attached to the backing to attach to a pocket; if the clip is magnetized, it may cling to a steel surface.

This invention relates to a new and improved pen holder attachment device. More particularly, the present invention provides a convenient means to attach a ballpoint pen, a pencil or similar implement so that it is conveniently at hand when needed. The pen or other device is held in a sheath so that it is not accidentally dislodged.

A particular feature of the present invention is the versatility with which the device may be attached. Thus at least two different means of attachment are provided in a single structure.

One means of attachment is the provision of apertured ears which receive a strap which may be fastened around the wrist of the wearer. This means of attachment is particularly useful for waiters, waitresses and others whose hands are occupied. The sheath is formed with a flat surface which is apertured in a plurality of apertures to receive the strap in different positions of alignment so that the device may be held on the wrist in a manner most convenient to the user. The strap may be used at different angles to attach to either the right or left wrist.

The same attachment device is also provided with a removable adhesive. When the adhesive is left in place, the device may be adhered to a flat smooth surface such as a wall, telephone base, table, cash register, dashboard, purse lining, notebook or the like. Since the adhesive is removable, it does not interfere with use of the device in strap attachment as previously described.

A metal clip may be stuck to the adhesive and used to attach to a shirt pocket or the like. The same clip may be magnetized and used to attach the device to a metal object such as a dashboard, steel sheet, etc.

Other objects of the present invention will become apparent upon reading the following specification and referring to the accompanying drawings in which similar characters of reference represent corresponding parts in each of the several views.

Figure 1:
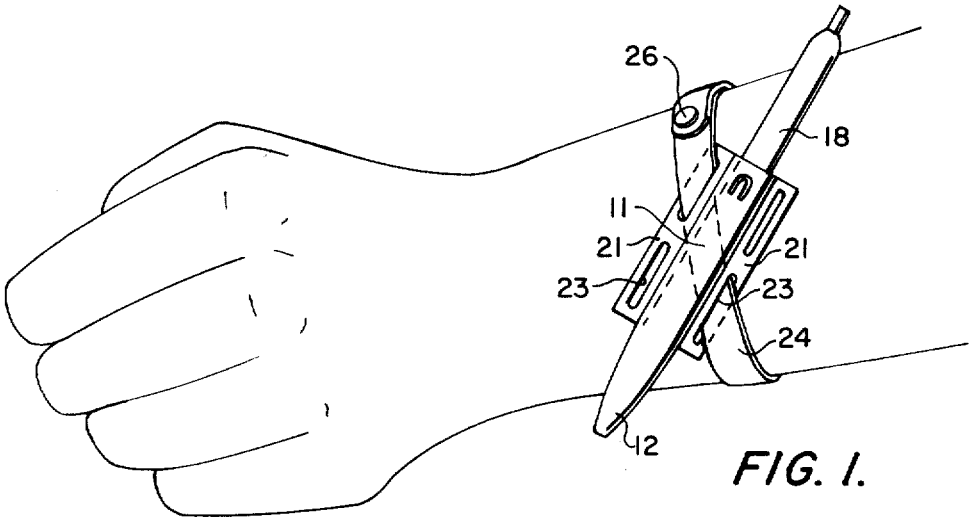
FIG. 1 is a side elevational view showing the device attached by means of a strap to the wrist of a wearer.
Figure 2:
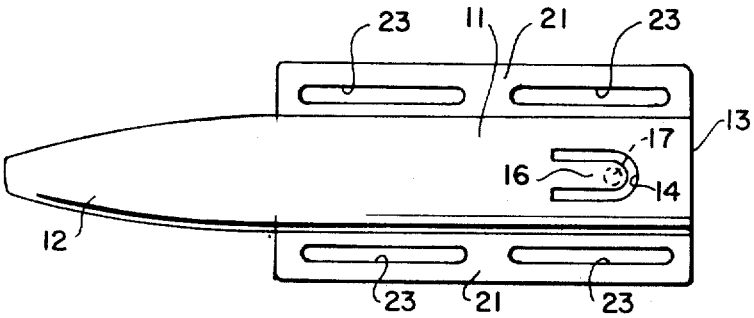
FIG. 2 is an enlarged top plan view of the device with the strap *removed* [moved]

The present invention is preferably formed of a piece of plastic shaped with a tubular sheath 11 which is closed at one end by a tapered point 12; other end 13 remains open. Adjacent the top of the sheath 11 is a horseshoe shaped cutout 14 which provides a flexible tongue 16 having a protuberance 17 extending inside the sheath. A ballpoint pen 18 or the like may be inserted in the opening 19 in sheath 11. The protuberance 17 bears against the pen 18 and restrains the same against unintentional dislodgement.

Projecting laterally on either side of sheath 11 is an ear 21 and the backs of ears 21 and of sheath 11 provide a substantially flat surface 22 of extended length and width. Apertures 23 are formed in ears 21. A preferred pattern of apertures is illustrated, there being two on each side, each being narrow and long.

As shown in FIG. 1, a strap 24 may be passed through one of the apertures 23 on each side of the device, encircling the wrist and held in place by a snap fastener 26, buckle or other conventional means for securing a strap in place. In the installation of FIG. 1, the strap 24 passes through an aperture 23 at one end of one ear 21 and through the other end of the opposite ear but such arrangement is optional. The versatility of the arrangement of apertures 23 permits the sheath 11 to be located on either wrist in such manner that the pen 18 is convenient for access by the user.

Figure 3:
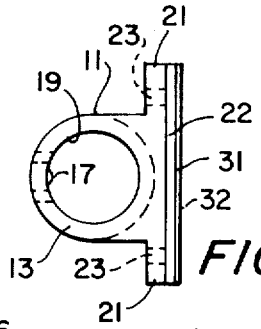
FIG. 3 is an end elevation of the structure of FIG. 2 viewed from the right.
Figure 4:
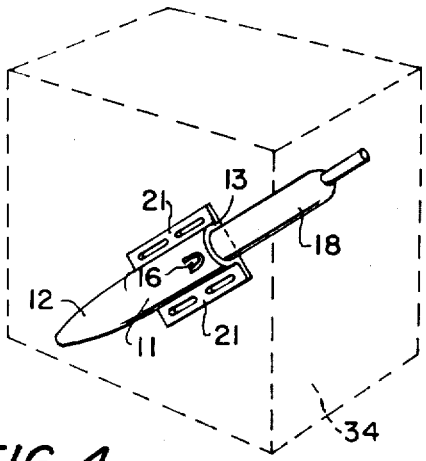
FIG. 4 is a perspective view showing the device attached by adhesive to a stationary object.

As best shown in FIG. 3, a rectangular piece of fiber *31* [21] dimensioned to fit the outlines of the surface 22 is provided withh pressure sensitive adhesive on both top and bottom surfaces. The adhesive on one side of fiber member 31 adheres to the surface 22 and the opposite surface is covered by a piece of paper 32 during transportation and prior to use. As shown in FIG. 4, when it is desired to attach the device to a flat surface 34 such as the base of a telephone instrument, a wall or a table, the paper covering 32 is peeled off and the adhesive on *fiber member* [block] 31 is used to secure the device in place at a convenient angle and location as is shown in FIG. 4.

It will be noted that when the installation of FIG. 1 is preferred, the *fiber member* [block] 31 is removed entirely from surface 22 and the strap 24 installed in place. Thus a principal feature and advantage of the invention is the versatility in the means of application.

Figure 5:
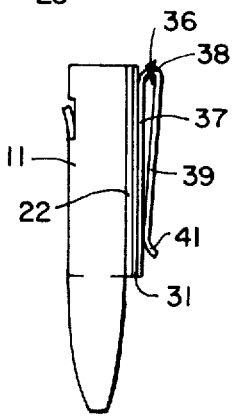
FIG. 5 is a side elevational view showing a clip attached to the device.

In FIG. 5 a clip 36 of springy metal is generally U-shaped having a flat first leg 37 stuck to member 31 and substantially coextensive therewith. Top 38 is bent about 360° so that second leg 39 contacts leg 37 and grips a pocket or other thin sheet interposed between the legs. To facilitate fitting the clip 36 over the pocket, the lower end 41 of leg 39 is bent outward.

Figure 6:
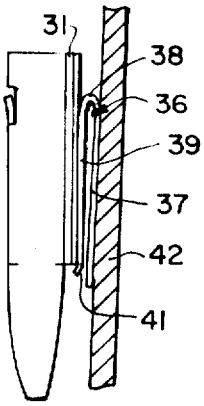
FIG. 6 is a view similar to FIG. 5 showing the clip magnetically attached to a metal object.

In FIG. 6, clip 36 is of a magnetizable material. Legs 37 and 39 are reversed from the position of FIG. 5. Leg 39 is stuck to backing 31. Leg 37 sticks to a steel member 42 by magnetic attraction.

What is claimed is:

1. A holder of the character described comprising a sheath shaped to receive a writing implement, ears projecting laterally on either side of said sheath, said holder formed with an elongated flat surface in back of said ears and said sheath, a piece of fiber having self-adhering adhesive on both surfaces thereof, one said surface adhering to said elongated flat surface, and being removable therefrom, the other said surface covered with a removable protective paper, each said ear being formed with a first long, narrow slot, and a second long, narrow slot spaced longitudinally relative to said first slot, and a wrist-encircling strap fitting through *a slot* [an aperture] in each said ear when said fiber is removed, whereby said strap may fit through the lower slot of one ear and the upper slot of the other ear, disposed at an angle relative to said sheath.

2. A holder according to claim 1 in which one end of said sheath is open and the other is closed off by a tapering point.

3. A holder of the character described comprising a sheath shaped to receive a writing implement, ears projecting laterally on either side of said sheath, said holder formed with an elongated flat surface in back of said ears and said sheath, a piece of fiber having self-adhering adhesive on both surfaces thereof, one said surface adhering to said elongated flat surface, and being removable therefrom, the other said surface covered with a removable protective paper, one end of said sheath being open and the other being closed off by a tapering point, said sheath being formed with a U-shaped forming a flexible tongue, said tongue having an inward projection bearing against an implement in said sheath to restrain dislodgement of said implement from said sheath.

4. A holder of the character described comprising a sheath shaped to recive a writing implement, ears projecting laterally on either side of said sheath, said holder formed with an elongated flat surface in back of said ears and said sheath, a piece of fiber having self-adhering adhesive on both surfaces thereof, one said surface adhering to said elongated flat surface, and being removable therefrom, and a metal clip having a pair of legs and a springy connecting portion joining said legs and biasing the ends of said legs opposite said connecting portion together, one said leg adhering to said fiber.

5. A holder according to claim 4 in which at least one said leg is magnetized whereby said holder may be held to a ferrous surface by magnetic attraction.

*6. A holder of the character described comprising a sheath shaped to receive a writing implement, ears projecting laterally on either side of said sheath, said holder formed with an elongated flat surface in back of said ears and sheath, each said ear being formed with a first long, narrow upper slot, and a second long, narrow lower slot spaced longitudinally relative to said first slot, and a wrist-encircling strap fitting through one said slot in each said ear, whereby said strap may fit through the lower slot of one ear and the upper slot of the other ear, disposed at an angle relative to said sheath.*

*7. A holder according to claim 6 in which one end of said sheath is open and the other end of said sheath is closed off by a tapering point.*

*8. A holder according to claim 6 in which said sheath is formed with a U-shaped slit forming a flexible tongue, said tongue having an inward projection bearing against an implement in said sheath to restrain dislodgement of said implement from said sheath.*

References Cited

The following references, cited by the Examiner are of record in the patented file of this patent or the original patent.

UNITED STATES PATENTS

| | | | |
|---|---|---|---|
| 1,603,044 | 10/1926 | Gise | 224—28 D |
| 2,297,806 | 10/1942 | Smith | 211—69.1 |
| 2,755,576 | 7/1956 | Golden | 248—205 A X |
| 3,148,777 | 9/1964 | Nichols | 211—69.1 |
| 3,350,045 | 10/1967 | Mayers | 248—205 A |

FOREIGN PATENTS

| | | | |
|---|---|---|---|
| 7,924 | 8/1911 | Great Britain | 224—28 D |
| 70,777 | 2/1916 | Switzerland | 224—28 D |

ROBERT J. SPAR, Primary Examiner

J. M. FORSBERG, Assistant Examiner

U.S. Cl. X.R.

211—69.1, 69.5; 248—205 A